US005423123A

United States Patent [19]

McQuilkin et al.

[11] Patent Number: 5,423,123

[45] Date of Patent: Jun. 13, 1995

[54] METHOD OF MAKING IMPINGEMENT/FILM COOLING PANELS

[75] Inventors: Frederick T. McQuilkin, Long Beach; Steven K. Dobbs, Fullerton, both of Calif.

[73] Assignee: Rockwell International Corporation, Seal Beach, Calif.

[21] Appl. No.: 131,181

[22] Filed: Oct. 4, 1993

[51] Int. Cl.[6] ............ B23P 15/00

[52] U.S. Cl. ............ 29/897.32; 29/897.2; 29/421.1

[58] Field of Search ............ 29/897.2, 897.31, 897.32, 29/889.72–889.722, 421.1; 228/157

[56] References Cited

U.S. PATENT DOCUMENTS

| | | | |
|---|---|---|---|
| 3,373,480 | 3/1968 | Fuchs, Jr. | 228/157 |
| 4,333,216 | 6/1982 | Slaughter | 29/889.72 |
| 4,534,503 | 8/1985 | Stephen et al. | 228/157 |
| 4,604,780 | 8/1986 | Metcalfe | 29/889.72 |
| 4,807,342 | 2/1989 | Lapeyre | 165/165 |
| 4,901,552 | 2/1990 | Ginty et al. | 29/421.1 |
| 5,024,369 | 6/1991 | Froes et al. | 228/157 |
| 5,204,161 | 4/1993 | Pettit et al. | 228/157 |
| 5,226,578 | 7/1993 | Douglas | 228/157 |
| 5,300,367 | 4/1994 | Bodart et al. | 428/586 |

*Primary Examiner*—Irene Cuda
*Attorney, Agent, or Firm*—Terrell P. Lewis; Charles T. Silberberg

[57] ABSTRACT

A method for making a cooling system for reducing the temperature of an exhaust-impinged structural panel includes an upper, primary cooling panel having boundary layer film-forming openings therein, a middle, secondary cooling panel having openings for directing a flow of cooling fluid into impingement with the primary cooling panel, and a lower cooling panel. The lower and upper panels together delimit a truss structure which structurally reinforces the cooling system, and the lower panel forms with the upper panel channels for conducting pressurized fluid first to the openings of the secondary cooling panel and then to the openings of the primary cooling panel.

12 Claims, 4 Drawing Sheets

510
410
420
430
520

114'

114"

METHOD OF MAKING IMPINGEMENT/FILM COOLING PANELS

BACKGROUND OF THE INVENTION

1. Field of the Invention

The present invention relates to methods and apparatus for cooling panel structures, and more particularly to a method and apparatus for the cooling or aircraft structures located rearwardly of the engine bay doors in the flow of hot, corrosive jet engine exhaust gases.

2. Background of the Invention

Typically, exhaust impinged aircraft structures located rearwardly of engine bays in the flow of hot, corrosive jet engine exhaust are subjected to acoustic, pressure and thermal loads not ordinarily encountered in either conventional airframe designs or in engines.

The design of exhaust impinged structures, contrasted with hot sections of engines, is dependent on thermal and geometric constraints. For example, exhaust-impinged structures are typically exposed to temperatures in the range of from about 1000° F. for a bomber to about 3000° F. for a fighter. Moreover, engine sections can generally be designed to minimize the thermal stresses, while design of the hot exhaust-impinged structures have configurations which rely on other considerations, such as infrared signature (IR) or Radar Cross Section (RCS) constraints. And as a rule, exhaust-impinged structures are required to conform to the surrounding aircraft structure. Such constraints increase the thermal stresses that lead to failure. Non-uniform heating and relatively low thermal conductivity aggrevate the thermal stress distribution, and additional problems are encountered, including low-cycle fatigue and increases in the mean stresses and buckling.

Exhaust-impinged structures are used in a complex and demanding service environment. At the surface exposed to the engine exhaust stream, the environment may be oxygen-depleted with respect to air, but it is still an oxidizing environment. Fuel additives may increase the corrosivity of the exhaust stream for the particular propulsion system. The temperature of the aft deck substructure varies from the ambient air temperature before takeoff to the temperature of any cooling air used or to temperatures approaching those of an uncooled deck, and therefore significant thermal gradients occur within the structure.

Material characteristics, too, place substantial constraints on the aircraft engine and airframe system integration capability. For example, without cooling, the baseline material typically used, Ti-6A1-4V, has insufficient high temperature strength, creep resistance, fatigue resistance and resistance to cyclic oxidation. The fatigue resistance of a structure cycled to high temperatures, with uneven heating, is related to the coefficient of thermal expansion (CTE), and a high CTE translates into greater thermal strains and thus stresses for a given temperature change.

It has therefore become necessary to find appropriate mechanisms for controlling temperature changes in these materials at these surface areas, as well as for cooling such surface areas.

Various systems and devices have been used to assist in reducing impingement temperatures, including heat pipes and backside cooling using fluids such as water, engine fan air, or compressed air.

Heat pipes are unsatisfactory because the hot structure temperatures reduction are typically very small. Heat pipes employ cyclical evaporation and condensation of a working fluid in an elongated closed system. The working fluid is generally an organic heat transfer fluid or a metal. Incorporating heat pipes into an exhaust-impinged structure is not a viable option based on current technologies. The level of heat flux that the heat pipe would be required to handle would result in a large, heavy condensing system. Additionally, the available working fluids are toxic and corrosive, requiring expensive, heavy materials for containment, which increases the complexity of field repairs and maintainability.

Backside cooling involves the flow of a fluid beneath the surface of an exhaust-impinged structure to conduct heat away. The heat transfer capability is dependent upon the temperature and flow rate of the fluid, as well as the thermal conductivity of the wall material. For example, the flow of engine bleed air below the hot surface would not, by itself, be an efficient cooling medium. The cooling efficiency could be increased by using inlet air, which is cooler than bleed air, and by the incorporation of cooling fins on the backside to maximize heat transfer. However, the cooling fins also lead to an increased rate of heat transfer into the cooling air, and as the air is heated, additional air must be drawn in to port the hot air away from the surface as it approaches the temperature of the deck surface. Although these methods may minimize thermal gradients and achieve a more uniform thermal profile across the surface, the overall temperature reduction of the hot structure is minimal.

Another arrangement that has been tried involves the isolation of susbstructure from the exhaust-impinged hot deck by attachment of the substructure with fasteners that "float" as the deck expands when the temperature increases. These floating surfaces reduce thermal loads transmitted to the substructure and relieve some of the loads induced by thermal expansion of the impinged surface.

Still another arrangement involves the attachment of a truss structure 20 to a separate cooling panel 10 (see FIG. 1 of the drawings) which forms the outer surface of the aircraft. This arrangement includes a cooling panel 12 secured atop the truss structure 20 via connecting hardware 16 and fastening elements 17 in such a manner as to form first chambers 18 between the upper surface 23 of the truss structure 20 and the lower surface 13 of the cooling panel. Second chambers 25 in the truss structure 20 carry pressurized fluid from a source to the chambers 18 via openings 21 in the portion of the truss structure which overlies the chambers 25. The cooling panel 10 is formed with a first set of openings 22 formed at the lower surface 13, and a second set of openings 24 formed at the upper surface 14 of the panel. Each opening in the first set constitutes a nozzle and has an axis of symmetry arranged substantially normal to the lower surface of the panel 10. Each opening of the second set also constitutes a nozzle and has an axis of symmetry disposed at an angle to the cooling panel upper surface 14. The two sets of openings fluidly communicate with each other through the thickness of the cooling panel, as well as with the fluid environments adjacent the upper and lower surfaces of the panel 12.

Pressurized fluid flowing into the second chambers 25 is forced through openings 21 into the first chambers 18, then through the first set of openings 22 causing a cooling of the panel 12, and then through the second set of openings 24 to create a film of cooling fluid flowing across the panel top surface.

None of the known concepts are workable; either they are excessively heavy due to part of the structures being non-load bearing or they do not incorporate impingement cooling and therefore require excessive air flow.

OBJECTS OF THE INVENTION

It is therefore a principal object of the present invention to provide a new and improved method and apparatus for cooling surfaces bathed In extremely hot temperatures, and in particular, exhaust-impinged structures, which will overcome all the disadvantages and drawbacks of similar known methods and apparatus.

Another object of the present invention is to provide a method and apparatus for cooling exhaust-impinged surfaces by forming a fluid film boundary layer on the surface to provide insulation from the impinging hot exhaust stream.

Another object of the present invention is to provide cooling of an exhaust-impinged skin structure by causing impingement of cooling fluid on the inner surface of the skin, and then directing the cooling fluid through nozzles in the skin to provide film cooling of the outer surface of the skin.

Still another object of the present invention is to provide apparatus and a method for cooling metallic surfaces of a structure exposed to a high temperature fluid stream by directing a cooling fluid from within the structure to and across the metallic surfaces such that an insulating fluid film boundary layer is created between the high temperature fluid stream and the metallic surface.

DESCRIPTION OF THE INVENTION

Figure 1:
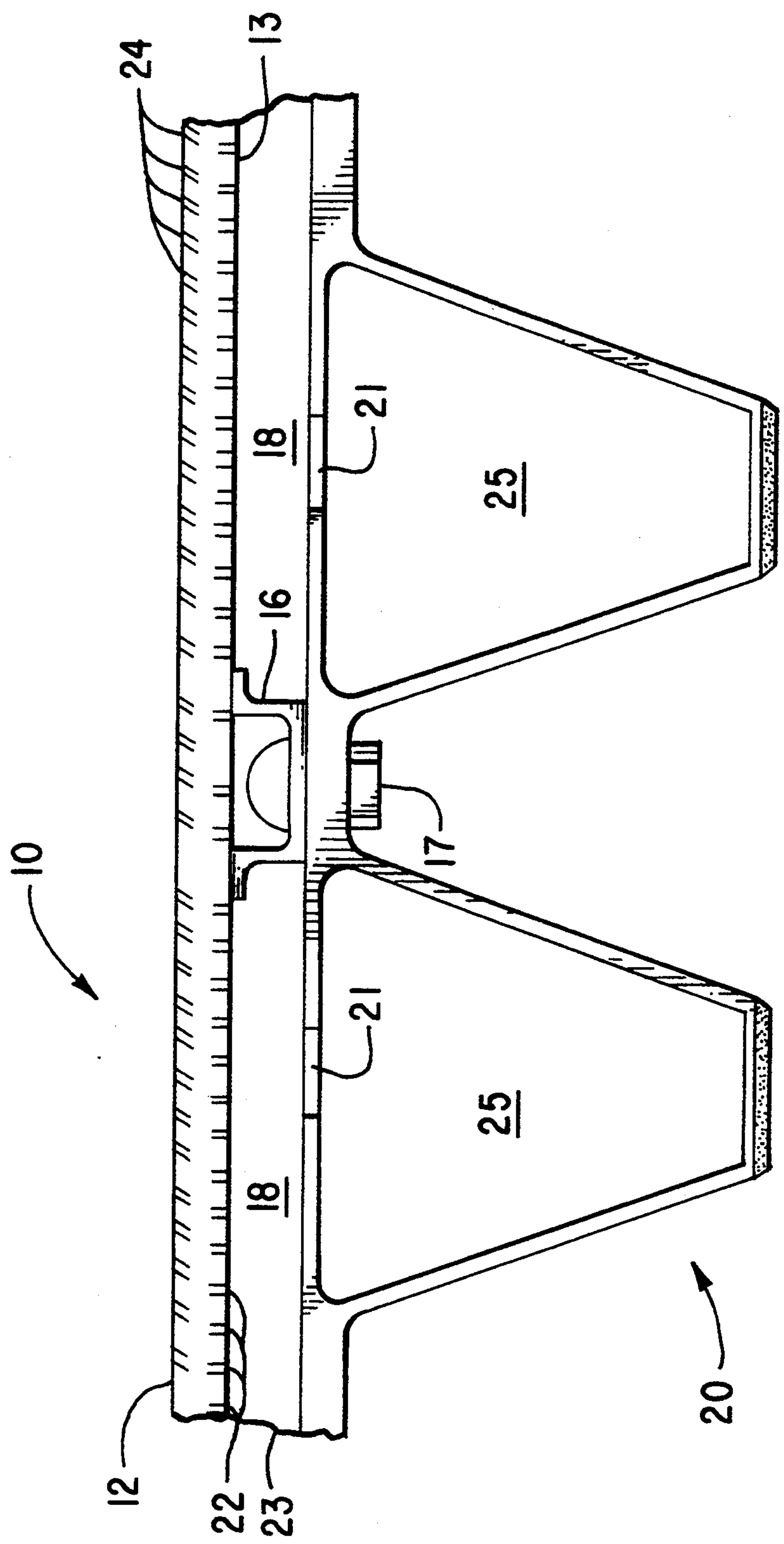
FIG. 1 illustrates Known cooling arrangement for an exhaust impinged structure.
Figures 2, 2A, 2B:
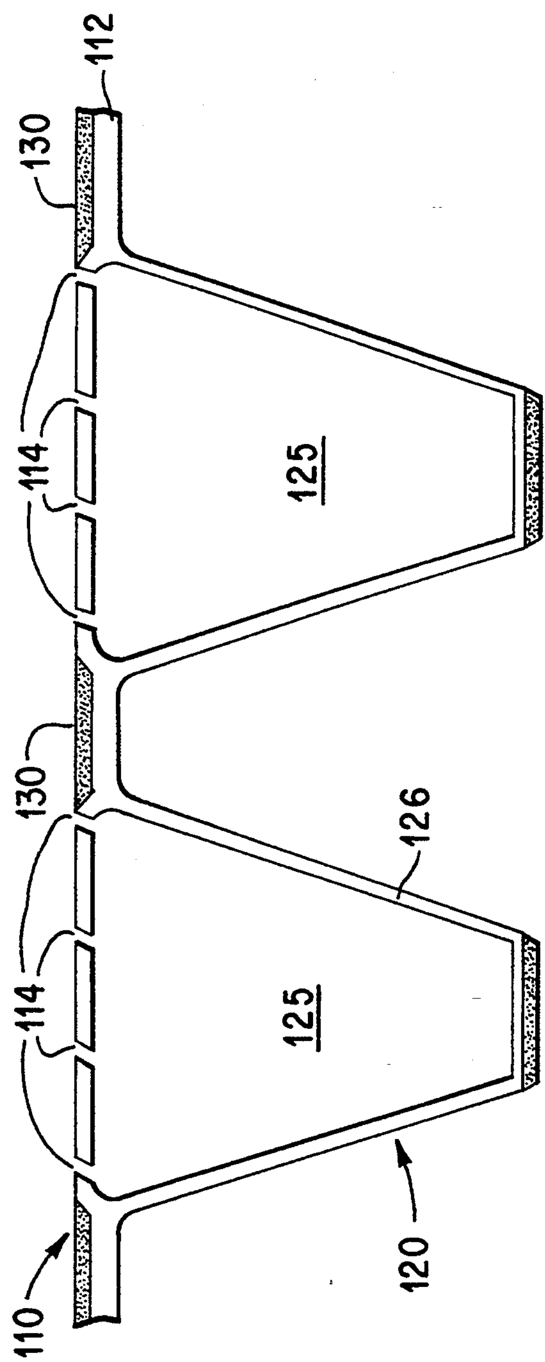
FIG. 2 shows one cooling arrangement for an exhaust impinged structure according to the present invention.
FIG. 2*a* illustrates a first alternative embodiment of the channel structure shown in FIG. 2.
FIG. 2*b* illustrates a second alternative embodiment of the channel structure shown in FIG. 2.

Referring now to FIG. 2, a first embodiment of the invention is shown wherein a cooling panel assembly 110 and a load bearing, truss core structure 120 have been integrated as a single, unitary structure. The cooling panel assembly includes a layer or thickness 112 of metal having an upper surface 111 and a lower surface 113. The truss structure 120 includes substantially triangular or hat-shaped truss sections 126. The truss sections are hollow and define elongated channels or chambers 125 through which pressurized fluid is conveyed from a source (not shown) such as engine bleed air, ram air or compressed air. A plurality of slots 114 is provided in the portion of cooling panel that covers each chamber or channel 125.

Each slot extends continuously along the channel length, and slots atop each channel are oriented parallel with the channel longitudinal axis. The panel and truss structure may include reinforcing members 130 at various locations.

FIGS. 2*a* and 2*b* show alternative embodiments of the channels in the truss structure of FIG. 2. In FIG. 2*a* and 2*b*, a single slot 114' is provided above and at an upper edge region of the channel. In FIG. 2*a*, the slot is provided through a port,on of the panel at which a reinforcing member is located. In FIG. 2*b*, the reinforcing element is located in the section of the panel which covers the channel, while the slot 114'' is disposed at the upper edge region of the channel.

Figure 3:
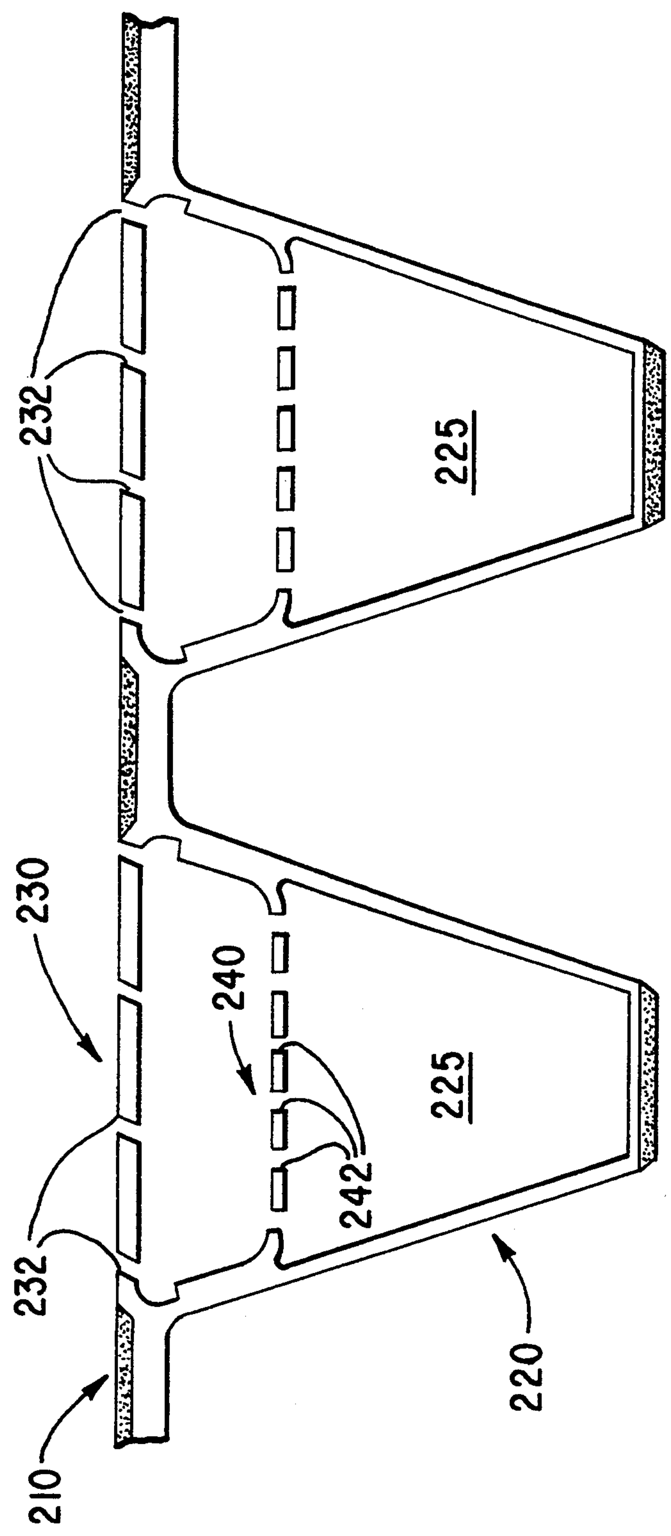
FIG. 3 shows a second cooling arrangement for an exhaust impinged structure according to the invention.

FIG. 3 shows a second embodiment of an exhaust impinged structure according to the present invention in which each of the channels 225 of the truss structure 220 include a secondary cover 240 unitarily formed with the channel, and a primary cover member 230. The primary cover member, together with the secondary cover 240, function as a cooling panel assembly 210. The secondary cover 240 is disposed substantially parallel with the primary cover member and divides the channel into an upper chamber and a lower chamber.

A first set of slots 242 in the secondary cover 240 delimits nozzles or openings extending substantially normal to the plane of the secondary cover. Slots 242 provide the function of directing fluid, flowing into the lower chamber from a pressure source (not shown), past the secondary cover 240 and into impinging contact with the underside of the primary cover member.

Another set of slots 232 in the primary cover member delimit nozzles or openings which direct the flow of fluid from the upper chamber into the ambient flow of hot exhaust fluid passing over the primary cover member as a boundary layer film or flow.

Figure 4:
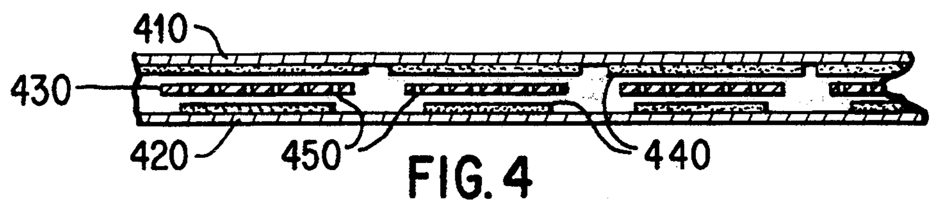
FIG. 4 shows an assembly of metallic elements arranged for placement in apparatus adapted for carrying out superplastic forming and diffusion bonding to produce the embodiment of the invention shown in FIG. 3.

In FIG. 4, there is shown an arrangement of sheets required for manufacture of the truss and cooling panel assembly shown in FIG. 3. The arrangement includes two parallel sheets of superplastically formable metal or metallic material, namely a top sheet 410 and a bottom sheet 420. Intermediate sheets 430 are disposed between the top and bottom sheets in spaced relationship to one another. A well-known stop-off composition 440, such as boron nitride or yttria nitride, is applied to the top sheet in a predetermined manner such that the top surface of each of the intermediate sheets 430 cannot diffusion bond to the lower surface of the top sheet 410 in the areas where stop-off is applied.

The stop-off composition is also applied to the bottom sheet 420 in such a manner that the bottom surface of each of the intermediate sheets will not diffusion bond in these areas to the upper surface of the bottom sheet with the exception of the end regions 432 of the intermediate sheets which are permitted contact with the bottom sheet. Each of the intermediate sheets 430 are provided with perforations 450 which provide fluid communication between the upper and lower surfaces of the intermediate sheets through the thickness thereof.

Figure 5:
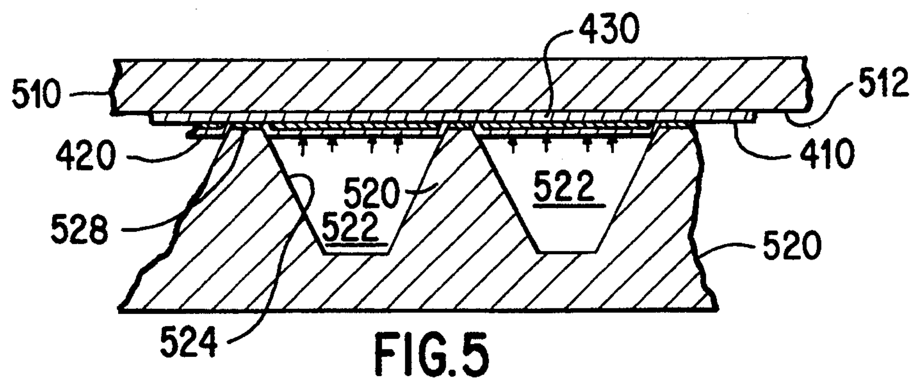
FIG. 5 shows the FIG. 4 assembly held between upper and lower press members of a forming apparatus during an initial stage of the forming process.

FIG. 5 shows the sheet stack of FIG. 4 disposed in, and held between, upper and lower forming members 510, 520 of a forming apparatus. The upper forming member 510 includes a substantially flat or smooth undersurface 512 which bears against the top sheet 410 of the sheet stack when the latter is disposed within the forming members. The lower forming member 520 is provided with a series of adjacently disposed substantially triangular wells 522 each having side walls 524, 526 and each pair of side walls terminating in an abutment having an upper surface 528 which exhibits a flat or smooth face disposed in facing relationship to the undersurface 512.

In the representation of FIG. 5, the sheet stack is being subjected to temperatures and pressures great enough to effect diffusion bonding between the stack top sheet 410 and the regions of the stack bottom sheet 420 which have not been covered by the stop-off composition. As is well-known in the art of diffusion bonding, stop-off composition which covers surfaces of the top and bottom stack sheets prevent those covered portions from bonding together. The sheet stack is positioned between the upper and lower forming members 510 and 520 of the forming apparatus such that the upper surface 528 of the lower forming member abutment bears against the bottom sheet of the stack squarely between adjacent edge regions of the the intermediate sheets 430.

During the diffusion bonding process, pressurized fluid is conveyed into the wells 522 and acts to hold the portion of the bottom sheet of the stack covered with stop-off composition firmly against the intermediate sheet while the abutment upper surface 528 presses together the non-covered portions of the bottom sheet, the edge regions of the intermediate sheet and the non-covered portions of the top sheet for such a length of time during this process as to permit diffusion bonding of the non-covered sheet portions.

Figure 6:
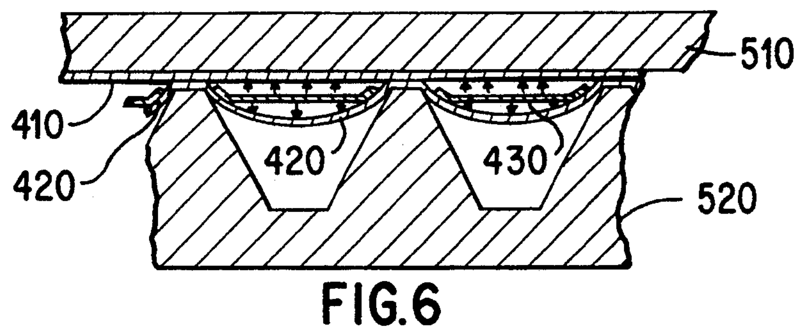
FIG. 6 shows the assembly and apparatus in a second stage of the forming process.

In the next step of the process, shown in FIG. 6, the pressure in the wells beneath the bottom sheet 420 is reduced and pressurized fluid is admitted into the sheet stack between the top and the bottom sheets. At this time, the bottom sheet begins to superplastically deform downwardly toward the bottom of the well and away from the intermediate sheet 430. The perforations in the intermediate sheet permit equalization of pressure within the stack on either side of the intermediate sheet, thereby preventing deformation of the intermediate sheet.

Figure 7:
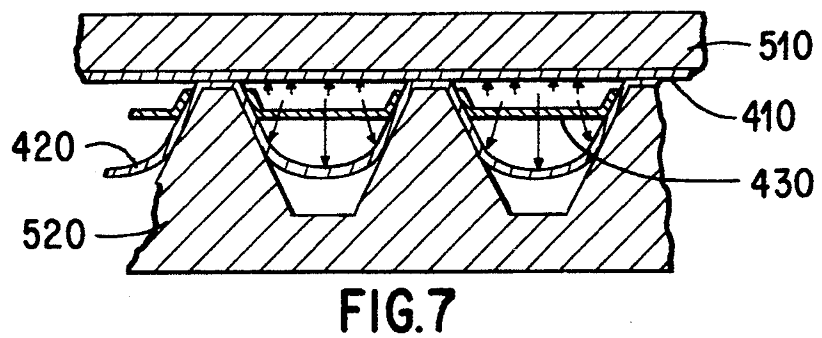
FIG. 7 shows the assembly and apparatus in a third stage of the forming process.

FIG. 7 shows that pressurized fluid in the stack continues to drive the bottom sheet toward the bottom of the well, while the intermediate sheet maintains its planar, parallel disposition relative to the top sheet 410.

Figure 8:
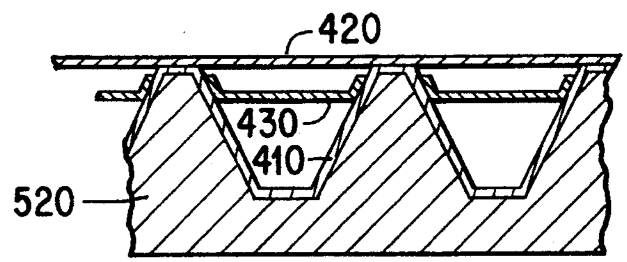
FIG. 8 shows the assembly and apparatus in a final stage of the forming process.

FIG. 8 shows the final configuration of the combined, unitarily formed truss core and cooling panel assembly following completion of the superplastic forming expansion process. A step in the fabrication of this combined assembly is the formation of the film-forming slots (see slots 232 in FIG. 3). These slots will be cut, as for example by mechanical or laser means, in the top stack sheet 410 after removal from the forming members.

While certain representative embodiments and details have been shown for the purpose of illustrating the invention, it will be apparent to those skilled in this art that various changes and modifications may be made therein without departing from the spirit or scope of this invention.

What we claim is:

1. A method for forming a load-bearing structural member including an inner skin, an outer skin, a plurality of fluid-conveying channels defined between the inner and outer skins, and means for directing fluid flowing through the channels into direct impingement with a portion of said outer skin, said method comprising:

providing a stack of metallic sheets, including an upper sheet, a lower sheet and at least one middle sheet, said at least one middle sheet delimiting a perimeter smaller than the perimeter of said upper sheet and having perforations extending therethrough, applying stop-off composition to said upper and lower sheets at predetermined regions such that preselected areas of said sheets do not bond to said at least one middle sheet, diffusion bonding said upper and lower sheets together where said sheets contact one another, then superplastically forming said diffusion bonded structure to form a truss core structure wherein said lower sheet expands away from said upper sheet at spaced locations to form channels depending from said upper sheet, and said at least one middle sheet is spaced from and extends parallel to said upper sheet.

2. The method of claim 1, wherein said at least one middle sheet comprises a plurality of sheets disposed side-by-side and spaced from one another, and said step of diffusion bonding includes attaching said top and bottom sheets together at spaced locations.

3. The method of claim 2, wherein said step of diffusion bonding said top and bottom sheets together further includes attaching said top and bottom sheets together on opposite sides of each of said middle sheets.

4. The method of claim 1, wherein said middle sheet is comprised of a material which is non superplastically formable.

5. The method of claim 1, wherein said step of diffusion bonding comprises gas diffusion bonding.

6. The method of claim 1, and further including the step of forming film-forming slots in said upper sheet following the step of superplastic forming.

7. The method of claim 6, wherein said step of forming said slots comprises cutting the upper sheet using laser means.

8. A method for forming a load-bearing structural member including inner and outer skins, fluid-conveying channel means extending between the skins, and means for directing fluid from the channel means into direct impingement with a portion of the outer skin, said method comprising:

providing a stack of metallic sheets, including an upper sheet, a lower sheet and at least one middle sheet having perforations extending therethrough;

applying stop-off means to facing surfaces of said upper and lower sheets such that preselected surface areas of said at least one middle sheet do not bond with said upper and lower sheet facing surfaces;

diffusion bonding said upper and lower sheets together where said sheets contact one another;

then superplastically forming said diffusion bonded structure to form a truss core structure with said lower sheet deformed away from said upper sheet at spaced locations to create said channel means, and said at least one middle sheet being spaced from and extending substantially parallel to said upper sheet.

9. The method of claim 8, wherein said middle sheet delimits a perimeter, and said step of applying stop-off means to facing surfaces of said upper and lower sheets comprises covering a larger area of said upper sheet facing surface with said stop-off means than the area of said at least one middle sheet.

10. The method of claim 9, wherein said step of applying stop-off means to facing surfaces of said upper and lower sheets further comprises covering a smaller area of said lower sheet facing surface with said stop-off means than the area of said at least one middle sheet.

11. The method of claim 8, wherein said middle sheet delimits upper and lower faces each having an area, and said step of applying stop-off means to facing surfaces of said upper and lower sheets comprises covering a larger area of said upper sheet facing surface with said stop-off means than the area of said at least one middle sheet upper face, and covering a smaller area of said lower sheet facing surface with said stop-off means than the area of said at least one middle sheet lower face.

12. The method of claim 8, wherein said at least one middle sheet comprises a plurality of sheets disposed side-by-side and spaced from one another, said step of diffusion bonding includes attaching said top and bottom sheets together at spaced locations.

* * * * *